Figures 1, 2:
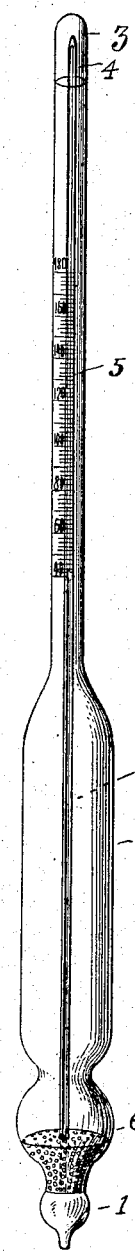

P. VOIGES.
HYDROMETER.
APPLICATION FILED FEB. 7, 1914.

1,172,647.

Patented Feb. 22, 1916.

WITNESSES:
Paul F. Rooger
Otto Lenan

INVENTOR,
Paul Voiges
BY
ATTORNEY.

UNITED STATES PATENT OFFICE.

PAUL VOIGES, OF BROOKLYN, NEW YORK.

HYDROMETER.

1,172,647.  Specification of Letters Patent.  Patented Feb. 22, 1916.

Application filed February 7, 1914. Serial No. 817,256.

*To all whom it may concern:*

Be it known that I, PAUL VOIGES, a subject of the Emperor of Germany, residing at Brooklyn, in the county of Queens and State of New York, have invented new and useful Improvements in Hydrometers, of which the following is a specification.

My invention relates to improvements in hydrometers for determining the specific gravity, density, etc. of liquids such as oils, electrolytes, acids and chemical solutions of all descriptions.

It provides a measuring device of this character by means of which the specific gravity of liquids may be very accurately determined.

It furthermore provides a specific gravity measuring device which is simple in construction and use, and enables one without mathematical calculation to determine simultaneously both the specific gravity and temperature of the liquid.

In the drawing:—Figure 1 illustrates in elevation a hydrometer constructed according to my invention and showing the temperature scale. Fig. 2 illustrates a portion of the upper stem and shows the capillary tube and specific gravity scale.

Referring to the drawings: —The hydrometer constructed according to my invention consists of a tube divided into three parts, the lower part 1 being a bulb containing mercury or other substance adapted to expand and contract with variations in the temperature of the substance with which it comes in contact, an enlarged portion 2, and a constricted portion 3 of uniform diameter, forming the stem. Within the enlarged portion and in communication with the mercury bulb 1 is mounted a capillary tube 4 extending into the stem 3, the enlarged portion 2 containing air and acting as a float. The stem 3 carries a thermometer scale 5 appropriately graduated and coöperating with the capillary tube in such a manner that the temperature of the liquid in which the hydrometer may be immersed may be read thereon. Also the bottom of the enlarged portion 2 contains a quantity of shot or other material 6 which act as a weight or counterpoise to keep the instrument in an upright position when immersed and floating in the liquid. The upper portion or stem 3 also carries a scale 7 which may be graduated to give by direct reading the specific gravity of the liquid in which the hydrometer is immersed.

It will be seen that the particular advantages occurring from the use of my instrument lie in the fact that both the specific gravity and temperature of a liquid may be read without removing the instrument from the liquid.

It is understood that various modifications of the specific form illustrated and described herein may be resorted to without departing from the scope of my invention.

Having thus described my invention, what I claim is:—

In a combined specific gravity and temperature indicating apparatus, a hollow body, a mercury bulb formed therewith, a tubular stem extending from said body oppositely to said bulb, said stem being of uniform cross section, a mercury tube extending from said bulb into said stem, graduations on said stem indicating the depth of immersion, a second series of graduations on said stem indicating the height of the mercury and a predetermined quantity of ballast in spherical form loosely contained in said hollow body above the mercury bulb.

In testimony whereof I affix my signature in the presence of two witnesses.

PAUL VOIGES.

Witnesses:
 OLADAR ORON,
 ALEXANDER DENES.